United States Patent [19]
Peeters et al.

[11] Patent Number: 5,670,570
[45] Date of Patent: Sep. 23, 1997

[54] CASTING RESIN BASED ON OLEFINICALLY UNSATURATED SILANES AND METAL ACID ESTERS

[76] Inventors: Hermann Peeters, Farnweg 60, D-53721 Siegburg; Birgit Bastin, Vulkanstrasse 12, D-53842 Troisdorf; Reinhard Matthes, Froschpfad 8 a, D-51427 Bergisch Gladbach, all of Germany

[21] Appl. No.: 589,369

[22] Filed: Jan. 22, 1996

[30] Foreign Application Priority Data

Feb. 4, 1995 [DE] Germany ................ 195 03 713.8

[51] Int. Cl.$^6$ ................................................ C08L 41/00
[52] U.S. Cl. .................. 524/547; 524/533; 428/34.1; 428/35.7
[58] Field of Search ............................. 524/730, 772, 524/547, 533; 428/34.1, 35.7

[56] References Cited

U.S. PATENT DOCUMENTS

| | | | |
|---|---|---|---|
| 4,221,697 | 9/1980 | Osborn et al. | 524/853 |
| 4,251,576 | 2/1981 | Osborn et al. | 524/787 X |
| 4,604,414 | 8/1986 | Kato et al. | 524/547 X |
| 4,826,901 | 5/1989 | Ittmann et al. | 524/547 X |
| 5,079,286 | 1/1992 | Hanisch et al. | 524/730 X |
| 5,135,981 | 8/1992 | Matsumara et al. | 524/547 |
| 5,385,973 | 1/1995 | Marciandi et al. | 524/730 |
| 5,399,601 | 3/1995 | Kusumi et al. | 524/730 X |

FOREIGN PATENT DOCUMENTS

| | | | |
|---|---|---|---|
| 0075957 | 4/1983 | European Pat. Off. | 524/730 |
| 0 107 764 | 5/1984 | European Pat. Off. | |
| 24 49 656 | 12/1975 | Germany . | |
| 1111952 | 5/1986 | Japan | 524/730 |

*Primary Examiner*—Judy M. Reddick

[57] ABSTRACT

The present invention relates to a casting resin based on curable acrylic and/or methacrylic ester and on finely divided inorganic filler, which contain as adhesion promoters organosilicon compounds and metal acid esters, the casting resin composition containing zirconium acetylacetonate and water. The invention also relates to a process for the preparation of the casting resins and to their use.

14 Claims, No Drawings

CASTING RESIN BASED ON OLEFINICALLY UNSATURATED SILANES AND METAL ACID ESTERS

BACKGROUND OF THE INVENTION

1. Field of the Invention

The present invention relates to a casting resin based on curable acrylic or methacrylic esters and finely divided inorganic fillers, which contains as an adhesion promoter an organosilicon compound and a metal acid ester, a process for their preparation and to their use.

2. Discussion of the Background

Casting resins based on curable acrylic and methacrylic esters and finely divided fillers—also referred to below as unsaturated casting resins—which contain, as adhesion promoters, organosilicon compounds containing one or more ethylenically unsaturated groups, are described in EP-0,107,764. In order to improve the product and processing properties, such as viscosity and dispersion, metal acid esters or metal chelates of metals of subgroup IV or V of the Periodic Table are added to the organosilicon compounds, so that synergistic effects result. The metal acid esters and metal chelates are restricted here in terms of their selection in that, in order to be effective, they must be soluble in the unsaturated casting resin system and compatible. In conformance with the requirement for metal acid esters/chelates of low color number which are registered in chemical substance lists such as EINECS, significant disadvantages result with respect to the selection of products. Metal chelates of titanium are frequently colored or have a tendency towards yellowing, and therefore do not meet the requirements for colorless systems.

The object of the present invention is to find a metal acid ester or metal chelate or another additive which, together with organosilicon compounds, bring about an improvement in the color number of the product in unsaturated casting resins. Zirconium acid esters and zirconium chelates alone, appear suitable based on their reactivity, substantial lack of color and non-yellowing. However, zirconium acetylacetonate (Zr—AcAc) per se is of such low solubility in the acrylic and methacrylic esters employed, for example, methyl methacrylate, that this measure does not lead to the desired success.

SUMMARY OF THE INVENTION

The object of the present invention is a casting resin based on curable acrylic or methacrylic esters and finely divided inorganic fillers, which contains as an adhesion promoter an organosilicon compound and a metal acid ester.

By adding a limited quantity of water into the first Zr—AcAc-containing, unsaturated casting resin, a stable, highly effective adhesion promoter and dispersion system is obtained. It is preferred to employ, for the Zr—AcAc-containing casting resin compositions, from 30 to 75% by weight of water, preferably from 40 to 60% by weight of water, based on the weight of Zr—AcAc. This system exhibits an even greater efficiency than, for example, an optimized market product based on 3-methacryloxypropyltrimethoxysilane and a zirconium ester, in particular owing to the fact that the viscosity-reducing effect is achieved almost immediately. One of the things which makes the invention surprising is that, despite the addition of water in the predetermined quantity range, the organosilicon compound remains stable and an expected polycondensation with these compounds does not occur.

Part of what makes this surprising is that, in general, metal acid esters/chelates catalyze the reaction of the silicon-functional group of the silanes and lead to rapid polycondensation in the presence of water. Where there is a deficit of water, the zirconium acetylacetonate is insoluble; with an excess of water, an insoluble and unreactive polysiloxane forms after only a short time from the organosilicon compound present in the casting resin.

DETAILED DESCRIPTION OF THE PREFERRED EMBODIMENTS

The casting resin compositions according to the invention, i.e., the so-called unsaturated casting resins, generally contain the following components; resin (acrylic and methacrylic esters), finely divided filler, at least one organosilicon, Zr—AcAc and water; however, other additives may also be present in the casting resin composition, examples being crosslinking agents, dispersion auxiliaries, color pigments, dyes and reinforcing substances.

The organosilicon compound and the Zr—AcAc can, in general, be added to the resin or to the casting resin as an additive.

The quantity of organosilicon compound is preferably from 0.2 to 4% by weight, preferably from 0.2 to 0.4% by weight, based on the weight of finely divided filler.

The quantity of Zr—AcAc is preferably from 0.05 to 1% by weight, based on the weight of finely divided filler in the casting resin composition.. The weight ratio of organosilicon compound to Zr—AcAc is generally from 10:1 to 1:1.

The proportion by weight of water, based on the weight of Zr—AcAc, employed in the casting resin composition according to the invention is suitably from 30 to 75% by weight preferably from 40 to 60% by weight. This addition makes the otherwise insoluble Zr—AcAc readily soluble in the resin or casting resin, without simultaneously causing the silane to undergo polycondensation. The system comprising organosilicon compound, Zr—AcAc and water in the resin is in general stable for at least 3 months. The preparation of the Zr—AcAc with water can be carried out, for example 1) by mixing the solid Zr—AcAc with water to give a product which can subsequently be handled readily as a solid, 2) by adding the water to the suspension of the Zr—AcAc in the resin or casting resin, or 3) by adding the water to the resin before introducing the Zr—AcAc. Where the quantity of water is less than 30% by weight, based on the weight of Zr—AcAc employed, the Zr—AcAc usually remains undissolved. With quantities Of water greater than 75% by weight, based on the weight of Zr—AcAc employed, the mixture of resin, Zr—AcAc and organosilicon compound becomes cloudy after a period of about 3 to 4 hours, with the formation of inactive polysiloxanes.

The composition according to the invention, comprising organosilicon compound, Zr—AcAc and water, brings about a distinct reduction in the viscosity of the casting resin composition relative to the unmodified casting resin, and an improvement in the physical properties.

The organosilicon compounds present in the casting resin composition according to the invention in turn contain one or more ethylenically unsaturated groups and are also referred to here as unsaturated organosilanes. They are preferably di- and trialkoxysilanes whose organofunctional radical contains a C=C double bond. This radical is generally linked to the silicon atom by a carbon atom, which may already be linked to the adjacent carbon by a double bond, as in the case of vinyltrialkoxysilanes. The double bond may also, however, be separated from the silicon atom by one or more carbon atoms, as in the case of allyltrialkoxysilanes or 3-methacryloxypropyltrialkoxysilanes. The corresponding dialkoxysilanes can also be employed. The alkoxy group of the unsaturated organosilanes preferably has 1 to 4 carbon atoms whose carbon chain can, if desired, be interrupted by an ether oxygen atom.

Examples of such unsaturated organosilanes are vinyltrimethoxysilane, vinyltriethoxysilane, vinyltris (methoxyethoxysilane), vinylmethyldimethoxysilane, 3-methacryloxypropyltrimethoxysilane, 3-methacryloxypropyltriethoxysilane, 3-methacryloxypropylmethyldimethoxysilane and 3-acryloxypropyltrimethoxysilane. oxysilane and 3-acryloyloxypropyltrimethoxysilane.

The resin components of the casting resin composition according to the invention is in general a curable acrylic resin, which term is intended to denote liquid polymers of optionally α-methyl- or α-ethyl-substituted acrylic esters. This ester component may be derived from aliphatic or aromatic alcohols of 1 to 18 carbon atoms and can, if desired be interrupted by an oxygen atom. These liquid polymers may, if desired, contain a further solid polymer, devoid of further crosslinking, from the same group, in dissolved or dispersed form. Such resins or resin mixtures which can be employed as components for casting compositions are known per se, as is their curing. One example is a methyl methacrylate resin.

The casting resin also contains fillers in the form of finely divided particles: the particle size is suitably not more than 100 μm. The preferred particle size ranges are between >0 and 60 μm, with particular preference to between >0 and 40 μm and, with very particular preference to between >0 and 10 μm; a particularly excellent activity is exhibited by the casting resin composition according to the invention with fillers in the particle size range between >0 and 10 μm.

The filler may be of natural or synthetic origin. It should possess a degree of hardness adapted to the intended use. Fillers of natural origin are, for examples, minerals such as aluminas, silica and the various modifications of the silicates, alumosilicates, carbonates, carbides and oxides. These substances can be modified by processes which are known per se. Examples of such fillers are: ground quartz, kaolin, mica, talc, alumina, chalk, limestone, dolomite, gypsum, barium sulphate; examples of synthetic fillers are ground glass, slag ash, and finely divided synthetic silicas. The casting resin compositions according to the invention can in general contain between 20% by weight and 80% by weight of finely divided fillers based on the total weight of the casting resin. The proportion of fillers in the finished casting resin is preferably between 50 and 70% by weight.

The fillers are preferably present in the casting resin composition according to the invention in uniform distribution, essentially devoid of agglomerations.

In addition to the above-mentioned fillers, the casting resins can also contain fibrous reinforcing substances or fillers, which need not conform to the conditions regarding particulate fineness. The fibrous substances include, for example, glass fibers, or mineral fibers, while the fillers include, for example, sand, which may have been pretreated with a conventionally known coupling agent.

If desired, the casting resins according to the invention can be colored with pigments and/or dyes. Examples of these are iron oxides, titanium dioxide, blanc fixe, zinc white, ultramarine blue and carbon black.

The liquid resins according to the invention are prepared in a manner known per se as described, for example, in DE-A 24 49 656. In general, Zr—AcAc and water are first of all mixed into a liquid, unsaturated resin, i.e., a base composition which contains an acrylic compound and/or methyl methacrylate, and subsequently the further additives and/or the fillers are suitably incorporated by dispersion. This initial resin charge may already contain the curing catalyst, preferably in substantially homogenous distribution, especially when the casting resin is to be cured by the action of heat. In general it is expedient to mix the curing catalyst and, if desired, the accelerators into the composition shortly before curing, and then to produce the desired casting.

The casting resins according to the invention are used, for example, for the sector of sanitary articles, such as wash basins, shower trays, sinks or toilet bowls, or, for example, for shaped articles in the construction industry, such as machine foundations, machine beds or containers.

Having generally described this invention, a further understanding can be obtained by reference to certain specific examples which are provided herein for purposes of illustration only and are not intended to be limiting unless otherwise specified.

The invention is illustrated in more detail by the following examples:

EXAMPLE 1

Selection of a suitable quantity of water.

The stated quantities of zirconium acetylacetonate (Zr—AcAc, Hüls AG) and an 3-methacryloxypropyltrimethoxysilane (DYNASYLAN MEMO, Hüls AG) are added, with stirring, to 40 g of methyl methacrylate at room temperature. Water is added to the dispersion, which is then stored.

|  | 1A | 1B | 1C | 1D | 1E | 1F | 1G |
|---|---|---|---|---|---|---|---|
| 3-Methacryloxypropyltrimethoxysilane | 30.8 g | 30.2 g | 29.1 g | 28.1 g | 27.2 g | 22.9 g | 16.0 g |
| Zr—AcAc | 7.7 g | 7.5 g | 7.3 g | 7.0 g | 6.8 g | 11.4 g | 16.0 g |
| Water | 1.5 g | 2.3 g | 3.6 g | 4.9 g | 6.0 g | 5.7 g | 8.0 g |
| Storage at room temperature; assessment after . . . |  |  |  |  |  |  |  |
| 1 hour | Cloudy heterogeneous | clear | clear | clear | clear | clear | clear |
| 24 hours | Cloudy | clear | clear | clear | 2 phases | clear | clear |
| 3 months | Cloudy, crystals | clear | clear | clear | 2 phases | clear | clear |

EXAMPLE 2

Effect on Viscosity.

1.5% by weight, based on filler, of an active additive substance is added to 75 g of a solution of a methyl methacrylate homopolymer in monomer [Plexit MV 51/methyl methacrylate (3:1)—Röhm GmbH]. Then 75 g of ground quartz (particle size range 0–40 μm) are incorporated by dispersion using a basket stirrer at 1200 rpm over the course of about 10 min, and after storage at 20° C. the viscosity is measured using a Brookfield viscometer (spindle 5) at a shear rate of 10 rpm.

|     |                                                                                                                             |            | Viscosity [mPa · s] after | | |
| --- | --------------------------------------------------------------------------------------------------------------------------- | ---------- | ---- | ---- | ---- |
| No. | Additives                                                                                                                   | Amount     | 1 h  | 4 h  | 24 h |
| 2 A | —                                                                                                                           | —          | 8200 | 8100 | 8100 |
| 2 B | 3-methacryloxypropyl-trimethoxysilane (MEMO)                                                                                | 1.13 g     | 7200 | 5200 | 3400 |
| 2 C | Formulation MEMO/Zr—AGA/water (8:2:1 parts by weight)                                                                       | 1.13 g     | 3400 | 3200 | 3200 |
| 2 D | Formulation MEMO/Zr—AcAc/water/methyl methacrylate (8:2:1:11 parts by weight)                                               | 2.26 g     | 3200 | 3200 | 3200 |
| 2 E | DYNASYLAN 5105-1K (formulation of MEMO and tetrabutyl zirconate, 50% in methyl methacrylate — commercial product of Hüls AG | 2.26 g     | 3800 | 3400 | 3200 |

EXAMPLE 3

Promotion of adhesion 1.5% by weight, based on filler, of an active additive substance is added to 175 g of a solution of a methyl methacrylate homopolymer in monomer [Plexit MV 51/methylmethacrylate (3:1)—Röhm GmbH]. Then 175 g of ground quartz (particle size range 0–40 μm) followed by 1.8 g of ultramarine blue, for coloring, are incorporated by dispersion using a basket stirrer at 1200 rpm over the course of about 10 min. After storage for 2 hours at 20° C. the viscosity is measured as in Example 2.

After a standing time of 5 hours in all, 1.75 g of a peroxide and 1.4 g of a 25% strength accelerator are stirred in. Then plates measuring 200×200×4 mm are cast, which cure at room temperature within 30 min. Post-curing is then carried out at 80° for 14 hours.

|     |                                                                                                                                                  |                 |                       | Flexural Strength [N/mm²] | |                             |
| --- | ------------------------------------------------------------------------------------------------------------------------------------------------ | --------------- | --------------------- | ---------- | ----------- | --------------------------- |
| No. | Additive                                                                                                                                         | Quantity [g]    | Viscosity [mPa · s]   | unstressed | after 16 h is boiling water | Appearance after stressing  |
| 3 A | —                                                                                                                                                | —               | 10200                 | 88.5       | 45.2        | severe whitening            |
| 3 B | 3-methacryloxypropyltrimethoxysilane (MEMO)                                                                                                      | 2.66            | 5800                  | 130.2      | 109.7       | slight whitening            |
| 3 C | Formulation MEMO/Zr—AcAc/water/methyl methacrylate (8:2:1:11 parts by weight)                                                                    | 5.32 5.32       | 2700 2700             | 132.3 132.3 | 114.9 114.9 | no whitening no whitening   |
| 3 D | DYNASYLAN 5105-1K (formulation of MEMO and tetrabutyl zirconate, 50% in methyl methacrylate) — commercial product of Hüls AG                     | 5.32            | 2600                  | 131.4      | 108.5       | no whitening                |
| 3 E | Blend of Zr—AcAc/water 2:1                                                                                                                       | 2.66            | 2800                  | 86.9       | 70.7        | severe whitening            |

Obviously, numerous modifications and variations of the present invention are possible in light of the above teachings. It is therefore to be understood that within the scope of the appended claims, the invention may be practiced otherwise than as specifically described herein.

This application is based on German patent application 195 03 713.8, filed in the German Patent Office Feb. 4, 1995, the entire contents of which are hereby incorporated by reference.

What is claimed as new and desired to be secured by Letters Patent of the United States is:

1. A casting resin composition comprising:
   (a) a curable acrylic or a methacrylic ester or both;
   (b) a finely divided inorganic filler;
   (c) an organosilicon compound;
   (d) 0.05–1% by weight, based on the weight of said filler, of zirconium acetylacetonate; and
   (e) 30–75% by weight, based on the weight of zirconium acetylacetonate, of water.

2. The casting resin composition of claim 1, wherein said casting resin composition comprises 0.2 to 4% by weight of organosilicon compound, based on the weight of finely divided filler.

3. The casting resin composition of claim 1, wherein the weight ratio of organosilicon compound to zirconium acetylacetonate in said casting resin composition is from 10:1 to 1:1.

4. The casting resin composition of claim 1, resin composition comprises 40 to 60% by weight of water, based on the weight of zirconium acetylacetonate.

5. The casting resin composition of claim 1, comprising 20 to 80% by weight of said finely divided filler based on the total weight of the casting resin composition.

6. The casting resin composition of claim 1, comprising 50 to 70% by weight of said finely divided filler based on the total weight of the casting resin.

7. The casting resin composition of claim 1, wherein said organosilicon compound is selected from the group consisting of vinyltrimethoxysilane, vinyltriethoxysilane, vinyltris (methoxyethoxysilane), vinylmethyldimethoxysilane, 3-methacryloxypropyltrimethoxysilane, 3-methacryloxypropyltriethoxysilane, 3-methacryloxypropylmethyldimethoxysilane and 3-acryloxypropyltrimethoxysilane.

8. The casting resin composition of claim 1 wherein said finely divided filler has a particle size of not more than 100 μm.

9. The casting resin composition of claim 1 wherein said finely divided filler has a particle size of not greater than 60 μm.

10. The casting resin composition of claim 1, wherein said finely divided filler has a particle size of not greater than 40 μm.

11. The casting resin composition of claim 1 wherein said finely divided filler has a particle size of not greater than 10 μm.

12. A process for the preparation of a casting resin composition comprising:
(a) a curable acrylic or a methacrylic ester or both;
(b) a finely divided inorganic filler;
(c) an organosilicon compound;
(d) 0.05–1% by weight, based on the weight of said filler, of zirconium acetylacetonate; and
(e) 30–75% by weight, based on the weight of zirconium acetylacetonate, of water comprising the steps of mixing a composition containing a curable acrylic or a methacrylic ester or both with zirconium acetylacetonate, organosilicon compound and water and dispersing, therein, filler and optionally further additives.

13. A cast article prepared by casting the casting resin composition of claim 1.

14. The cast article of claim 13, wherein said cast article is selected from the group consisting of a wash basin, a shower tray, a sink, a toilet bowl, a machine foundation, a machine bed and a container.

* * * * *